US011375690B2

(12) United States Patent
Mai et al.

(10) Patent No.: US 11,375,690 B2
(45) Date of Patent: Jul. 5, 2022

(54) VORTEX FOUNTAIN

(71) Applicant: Pioneer Pet Products, LLC, Cedarburg, WI (US)

(72) Inventors: David R. Mai, Mequon, WI (US); Qing He, North Andover, MA (US); Wei Chao, Changsha (CN); Tao Huang, Changsha (CN); John M. Lipscomb, Cedarburg, WI (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 10 days.

(21) Appl. No.: 16/271,231

(22) Filed: Feb. 8, 2019

(65) Prior Publication Data

US 2019/0239476 A1 Aug. 8, 2019

Related U.S. Application Data

(60) Provisional application No. 62/627,846, filed on Feb. 8, 2018.

(51) Int. Cl.
*A01K 7/02* (2006.01)
*F04B 23/02* (2006.01)

(52) U.S. Cl.
CPC .............. *A01K 7/02* (2013.01); *F04B 23/021* (2013.01)

(58) Field of Classification Search
CPC ......... B05B 17/08; F04B 23/021; A01K 7/02; A01M 1/106; E03D 9/08; E03D 11/08; E03D 5/016
USPC .............. 239/16–20, 23, 28; 4/317, 443–446
See application file for complete search history.

(56) References Cited

U.S. PATENT DOCUMENTS

| | | | | |
|---|---|---|---|---|
| 2,279,683 | A * | 4/1942 | Judell | E03C 1/262 |
| | | | | 4/288 |
| 6,079,951 | A | 1/2000 | Morton | |
| 6,640,747 | B2 | 11/2003 | Reusche | |
| 7,549,395 | B2 * | 6/2009 | Stenberg | A01K 7/02 |
| | | | | 119/74 |
| 8,844,465 | B2 * | 9/2014 | Holland | A01M 1/106 |
| | | | | 119/6.5 |
| 2017/0326574 | A1 | 11/2017 | Ding | |

FOREIGN PATENT DOCUMENTS

| | | |
|---|---|---|
| CN | 201300646 | 9/2009 |
| CN | 107313480 | 11/2017 |

* cited by examiner

*Primary Examiner* — Steven M Cernoch
(74) *Attorney, Agent, or Firm* — Boyle Fredrickson S.C.

(57) ABSTRACT

A vortex fountain or waterer that incorporates measures to induce swirl in liquid moving toward a drain opening of the fountain to inhibit the accumulation of debris is provided. The fountain may have a bowl including a base surface having a slope that is configured to create a vortex in the liquid flowing toward the drain opening to induce movement of a quantity of water, where the bowl is located above a basin configured to hold the liquid. The fountain may also include a pump outlet jet that can be positioned about the bowl to induce swirl about the bowl. The fountain may also include a drain tube located beneath the drain opening, and an extended guide tube extending downwardly towards the bottom of the basin. When the liquid passes through the drain, drain tube, and guide tube, oxygen is incorporated into the liquid as the liquid reaches the basin.

18 Claims, 9 Drawing Sheets

VORTEX FOUNTAIN

CROSS-REFERENCE TO RELATED APPLICATIONS

The present application claims priority on U.S. Provisional Patent Application Ser. No. 62/627,846, filed on Feb. 8, 2018 and entitled Vortex Fountain, the entirety of which is hereby incorporated herein by reference.

STATEMENT AS TO RIGHTS TO INVENTIONS MADE UNDER FEDERALLY SPONSORED RESEARCH AND DEVELOPMENT

Not applicable.

FIELD OF THE INVENTION

The present invention relates generally to fountains and, more particularly, relates to a fountain that incorporates measures to impart a swirl to liquid flowing toward a drain opening of the fountain so as to reduce the accumulation of debris in the fountain. The present invention also generally relates to a fountain that results in the incorporation of air into the liquid that is being passed through the fountain, which enhances the amount of oxygen contained in the liquid that flows therethrough. The invention additional relates to a method of operating such a fountain.

BACKGROUND OF THE INVENTION

Fountains are widely used for supplying liquid to a volume on a replenishable basis. The term "fountain" as used herein applies to any device that supplies water or another liquid to a defined volume on a continuous or intermittent basis while draining liquid from that volume. One such type of fountain is a "recirculating fountain", which recirculates a portion or all of the drained fluid from the volume, typically using a pump. The typical recirculating fountain includes a bowl having a base or floor and having a perimeter wall defining the volume. The typical recirculating fountain additionally includes a basin beneath the base and a pump that pumps water from the basin to the bowl. The pump is typically, but not necessarily, a submersible pump housed within the basin. The fountain may operate on a closed loop basis or may be coupled to a source of liquid that replenishes liquid that is consumed, evaporated, or otherwise is depleted. Recirculating fountains have myriad domestic, commercial, and industrial uses; including as pet and other animal watering devices, human drinking fountains, habitats for aquatic life, and washers for produce, machine parts, etc. The recirculated liquid may be water, a detergent, a solvent, etc.

While various recirculating fountains have enjoyed considerable commercial success, improvements are nonetheless desirable.

Figure 8:
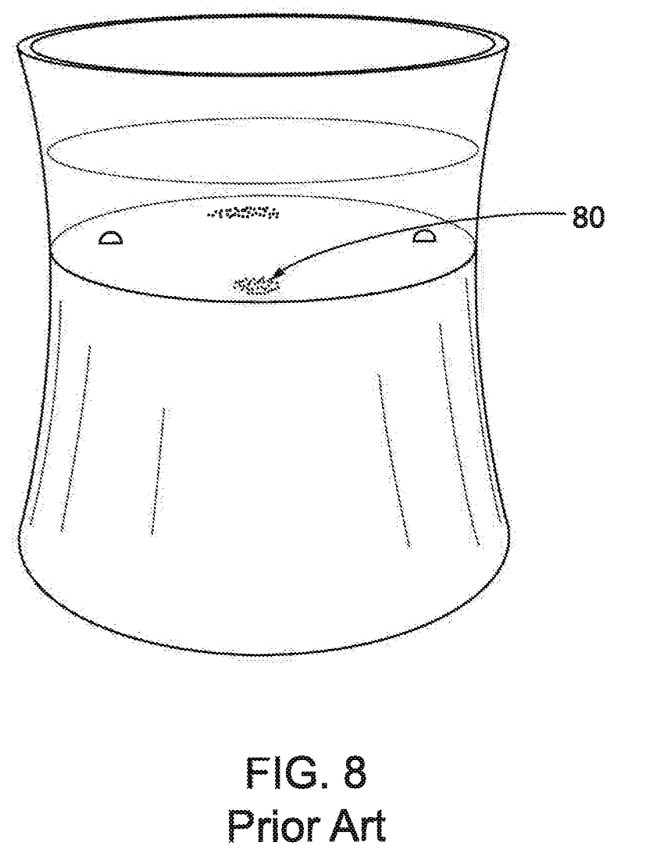
FIG. 8 is a top perspective view of a fountain of the prior art.
Figure 9:
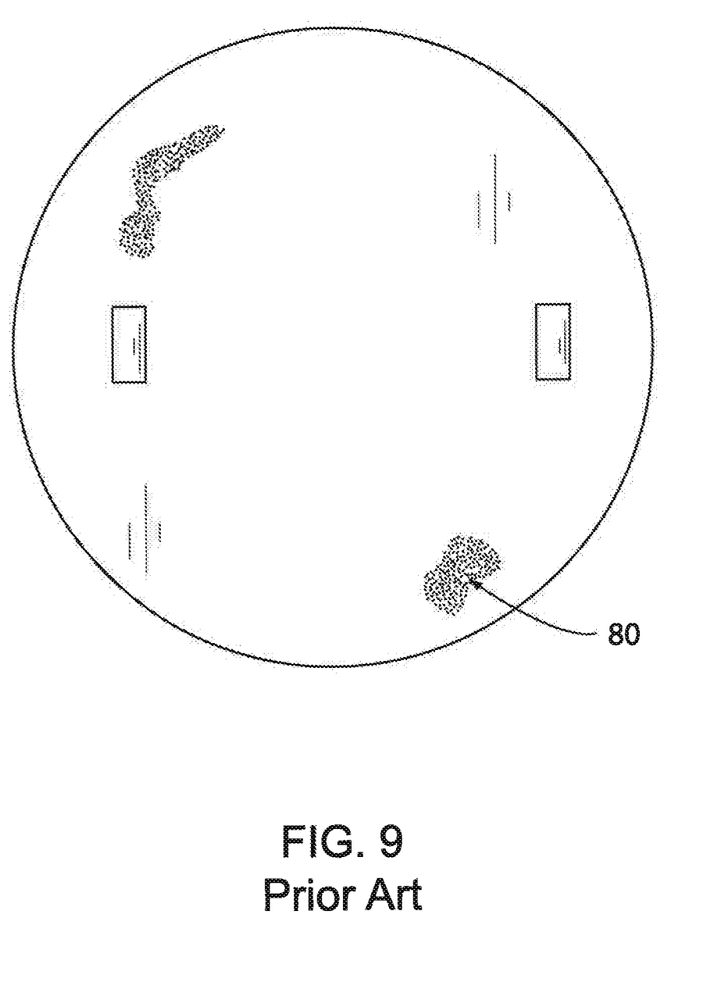
FIG. 9 is a top plan view of the fountain of the prior art of FIG. 8.

For instance, many traditional fountains, including recirculating fountains, have "dead zones" or areas where debris may collect due to insufficient liquid flow through the areas to flush the debris from those areas. "Debris" in this regard means any foreign object that can be filtered or otherwise mechanically removed from or otherwise separated from a liquid. Debris may include, for example, grass, straw, food, hair, leaves, sand, dirt, grease, oil, etc. Due to uneven water flow in the base and/or bowl, "dead zones" of low or no flow may exist in the bowl. Debris may accumulate in these dead zones due to insufficient water flow to flush debris from them. These dead zones are most apt to form on the base but, depending on the flow characteristics of a given fountain, can form anywhere within the bowl. FIGS. 8 and 9 show fountains of the prior art where multiple dead zones collecting debris 80 are located in the base of the bowl.

These dead zones are undesirable in many applications. For instance, if the fountain is an animal watering device, the debris in the bowl can discourage animals from drinking the water in the bowl. The presence of debris in a watering or drinking fountain also can compromise the potability of the water. The fountain therefore requires frequent cleaning. The water or other liquid also may appear cloudy due to the accumulation of debris in dead zones, detracting from the aesthetics of the fountain. In residential, commercial or industrial washer settings in which flowing liquid is used to clean such diverse items as produce, dishes, or machine parts, the dead zones significantly reduce the effectiveness of the washer. Agitators that could enhance liquid movement in the bowl are not acceptable in many applications due to the fact that agitators typically generate excessive turbulence that can be noisy, aesthetically unattractive, off-putting to human and animals, and/or detrimental to fragile items in the bowl. Turbulence also can exacerbate cloudiness and hinder debris flow to the drain.

Improvements to traditional recirculating fountains therefore are desired. For instance, recirculating fountains are desired that result in the incorporation of oxygen into the liquid that is being circulated about the fountain.

What is needed is an improved fountain capable of enhancing liquid flow through the fountain to reduce or prevent the size and/or number of dead zones in the fountain's bowl and thus to inhibit or prevent the collection of debris in the bowl.

What is further needed is a fountain capable of enhancing liquid movement in the bowl of a fountain without generating excessive turbulence in the bowl.

What is further needed is a method of enhancing water flow through the bowl of a fountain and incorporating oxygen into the liquid as it passes through the fountain.

SUMMARY OF THE INVENTION

In accordance with an aspect of the invention, a recirculating fountain or waterer is provided incorporating measures for inducing a swirl to the liquid within a bowl of the fountain of sufficient magnitude to reduce or eliminate dead zones and thus to reduce or eliminate debris accumulation and/or to induce the incorporation of oxygen with the liquid while it moves about the fountain. "Swirl" as used herein means liquid flow having a circumferential component. The flow may be purely circumferential or may have a radial component as well. A swirl with an inward radial component, resulting in circumferential flow spiraling toward a center, is considered a "vortex". The swirl may be purely within a horizontal plane or may have a positive or negative vertical component as well. The swirl inducing measures may be incorporated into the base of the bowl and/or within the interior volume of the bowl.

According to an aspect of the invention, the fountain may a liquid-holding basin with the bowl positioned over the basin. The bowl may include a base surface, a drain opening formed in the base surface, and a perimeter wall extending upwardly from the base surface to define an interior. In this case, the liquid in the basin may be recirculated using a pump having an intake in fluid communication with the basin and a discharge outlet in fluid communication with the interior of the bowl. The liquid can be swirled about the bowl by the flow of liquid into and out of the bowl to inhibit accumulation of debris in the bowl. The liquid can also be swirled to entrain oxygen into the liquid while it falls into the basin.

In accordance with another aspect of the invention, the bowl may have an opening formed therein. More specifically, the opening may be formed in the base surface of the bowl. A sidewall may extend around the opening, and a shelf may be formed in the sidewall. A drain bowl plug having the drain opening extending therethrough may be removably insertable into the opening. The drain bowl plug may be insertable into the opening such that a side of the plug abuts the sidewall. Additionally, a filter may be inserted into the opening where it rests upon the shelf, and the plug may hold the filter in place relative to the shelf.

In accordance with yet another aspect of the invention, the fountain may further include a drain tube and a guide tube. The drain tube may extend downwardly from the shelf. The guide tube may be releasably attached to the drain tube. When the liquid exits the drain opening, it moves through the filter, into the drain tube, and from the guide tube into the basin. Oxygen can be incorporated with the liquid at any point as the liquid moves about the fountain, including when it falls through the guide tube into the basin.

In accordance with another aspect of the invention, the fountain may also include at least one pump outlet jet that is located in the bowl and that is in fluid communication with the discharge outlet of the pump. The at least one pump outlet jet includes an outlet that opens into the interior of the bowl. The outlet may extend generally toward the drain opening. An uplift tube may extend from an outlet of the pump to the at least one pump outlet jet.

According to another aspect of the invention, the slope of the base surface and the slope of the drain bowl plug may be configured to create a vortex to induce movement of a quantity of liquid from the fountain towards the drain opening. Similarly, at least a portion of the base surface and at least a portion of the drain bowl plug may be sloped curvilinearly toward the drain opening so as to induce a vortex in the liquid flowing toward the drain opening.

According to yet another aspect of the invention, a method of using a recirculating fountain is provided. Initially, a liquid is supplied to an interior of a bowl having a base surface and a drain opening formed therein. Thereafter, the liquid may be moved about the bowl and down into the drain opening. While this occurs, a swirl is induced to the liquid during the supplying and/or moving steps. This, in turn, helps to inhibit accumulation of debris in the bowl. Additionally, the method may include the step of dropping the liquid from the drain opening into a guide tube extending beneath an exhaust outlet. When the liquid is dropped from the drain opening into the basin, oxygen is incorporated with the liquid. The method may also include steps of moving the liquid from the drain opening, through a filter, and into the basin, as well as pumping the liquid through a pump mounted to the basin through a discharge outlet in fluid communication with the bowl to induce a swirl about the basin. Further still, the method may include the pumping of the liquid through a pump outlet into an uplift tube, from the uplift tube out of the at least one pump outlet jet, after which the liquid moves towards the drain opening. Also, the method may include the steps of removing a drain bowl plug from an opening formed in the base surface of the bowl, removing the filter from a shelf formed in a sidewall extending around the opening, and replacing the filter.

Other objects, features and advantages of the present invention will become apparent after review of the specification, claims and drawings. The detailed description and examples enhance the understanding of the invention, but are not intended to limit the scope of the appended claims.

BRIEF DESCRIPTION OF THE DRAWINGS

Preferred exemplary embodiments of the invention is illustrated in the accompanying drawings in which like reference numerals represent like parts throughout, and in which.

DETAILED DESCRIPTION OF THE PREFERRED EMBODIMENT

Before the present materials and methods are described, it is understood that this invention is not limited to the particular methodology, protocols, materials, and reagents described, as these may vary. It is also to be understood that the terminology used herein is for the purpose of describing particular embodiments only, and is not intended to limit the scope of the present invention, which will be limited only by the appended claims.

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", and "having" can be used interchangeably.

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described.

As mentioned above, many of the concepts described herein are usable with a variety of fountains having myriad applications. For instance, fountains falling within the scope of the present invention could be used in residential, commercial, and industrial cleaning applications, with produce washing machines, with sinks, with systems configured to drain grease, oil, and other solvents, and in many other applications.

Referring now to the drawings, specific exemplary embodiments are illustrated in which the fountain comprises an animal watering fountain or "waterer" 20 configured to supply drinking water to an animal such as a dog. The illustrated waterer 20 is a recirculating waterer having a bowl 22 with a drain opening 24, a basin 26 located beneath the bowl 22, and a pump 28 for recirculating water drained from the bowl 22 back to the interior of the bowl 22. The waterer 20 may also include and at least one pump outlet jet 34. FIGS. 1-5 illustrate a recirculating waterer 20 configured to create a vortex 30 of a quantity of water 32, which induces movement of water 32 to maximize a swirl effect such that dead zones that otherwise would occur in the volume of water 32 due to debris accumulation are minimized or eliminated. These and other components will be further described below.

Figure 1:
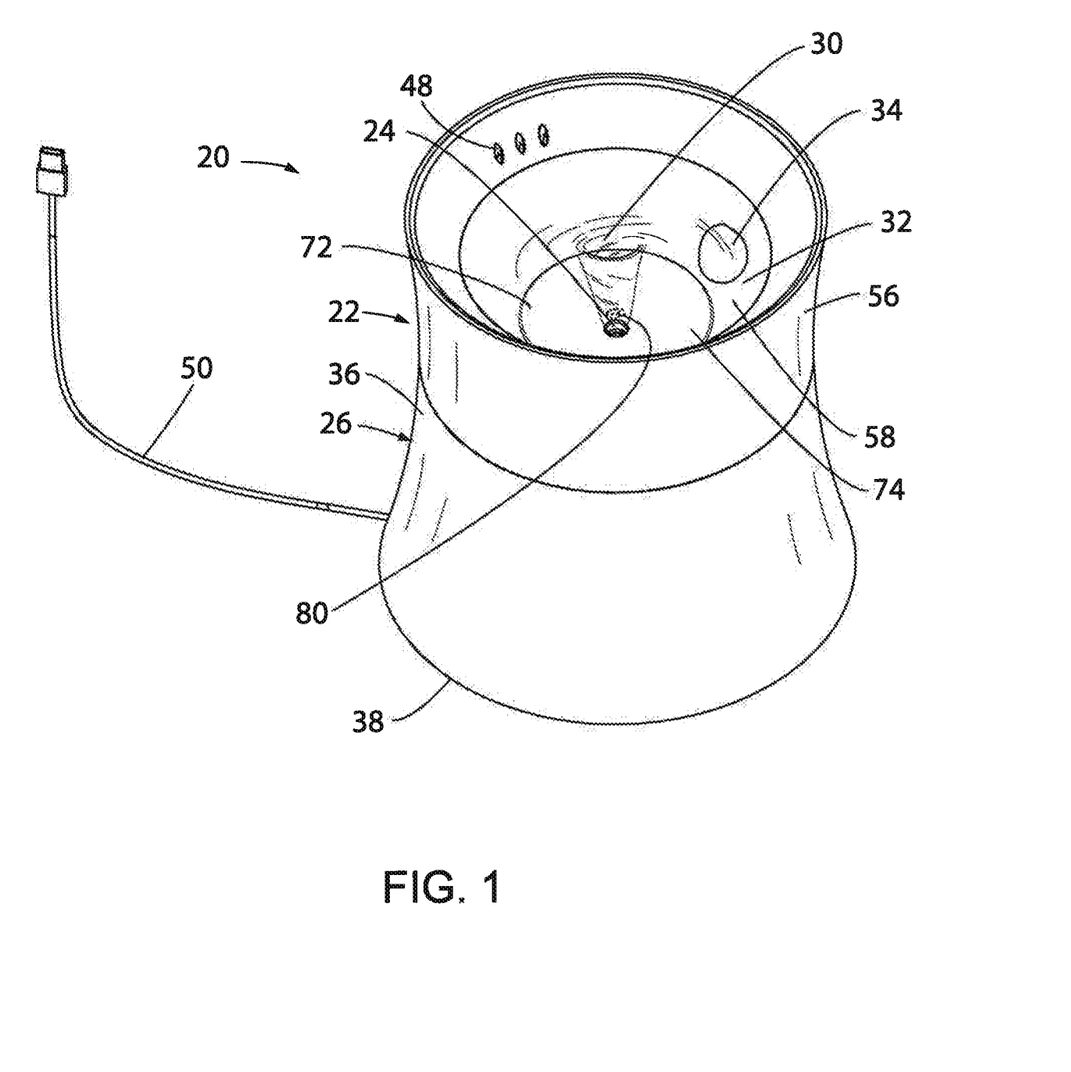
FIG. 1 is a top perspective view of a first embodiment of a fountain constructed in accordance with the invention, taking the form of recirculating vortex waterer.
Figure 2:
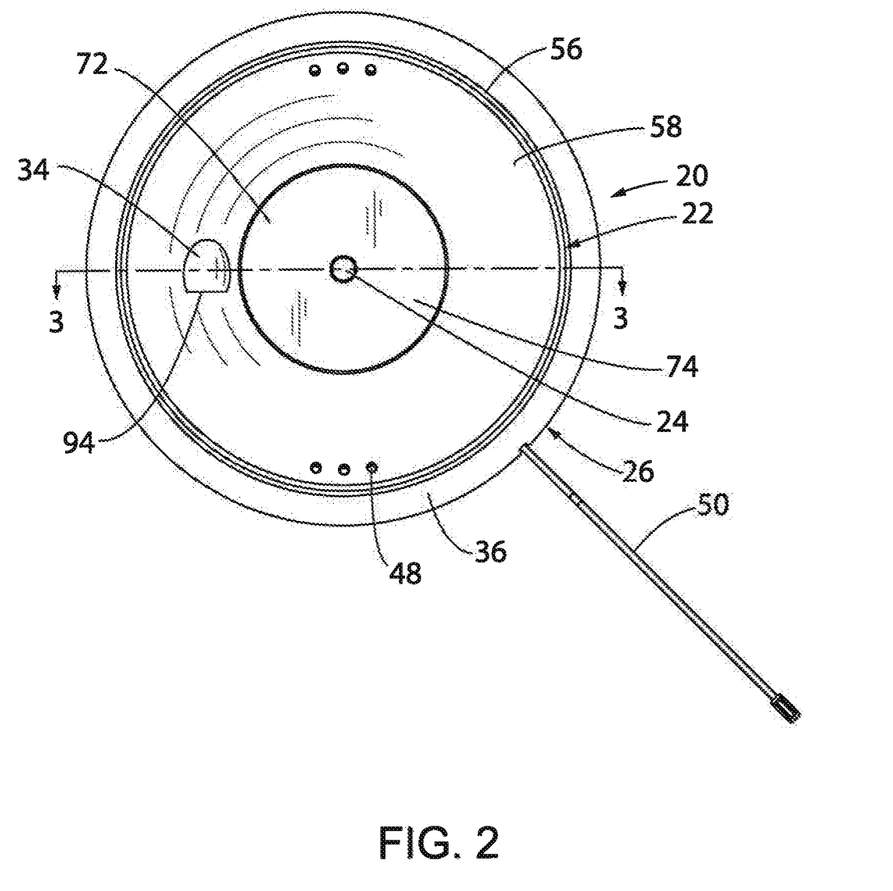
FIG. 2 is a top plan view of the recirculating vortex waterer of FIG. 1.
Figure 3:
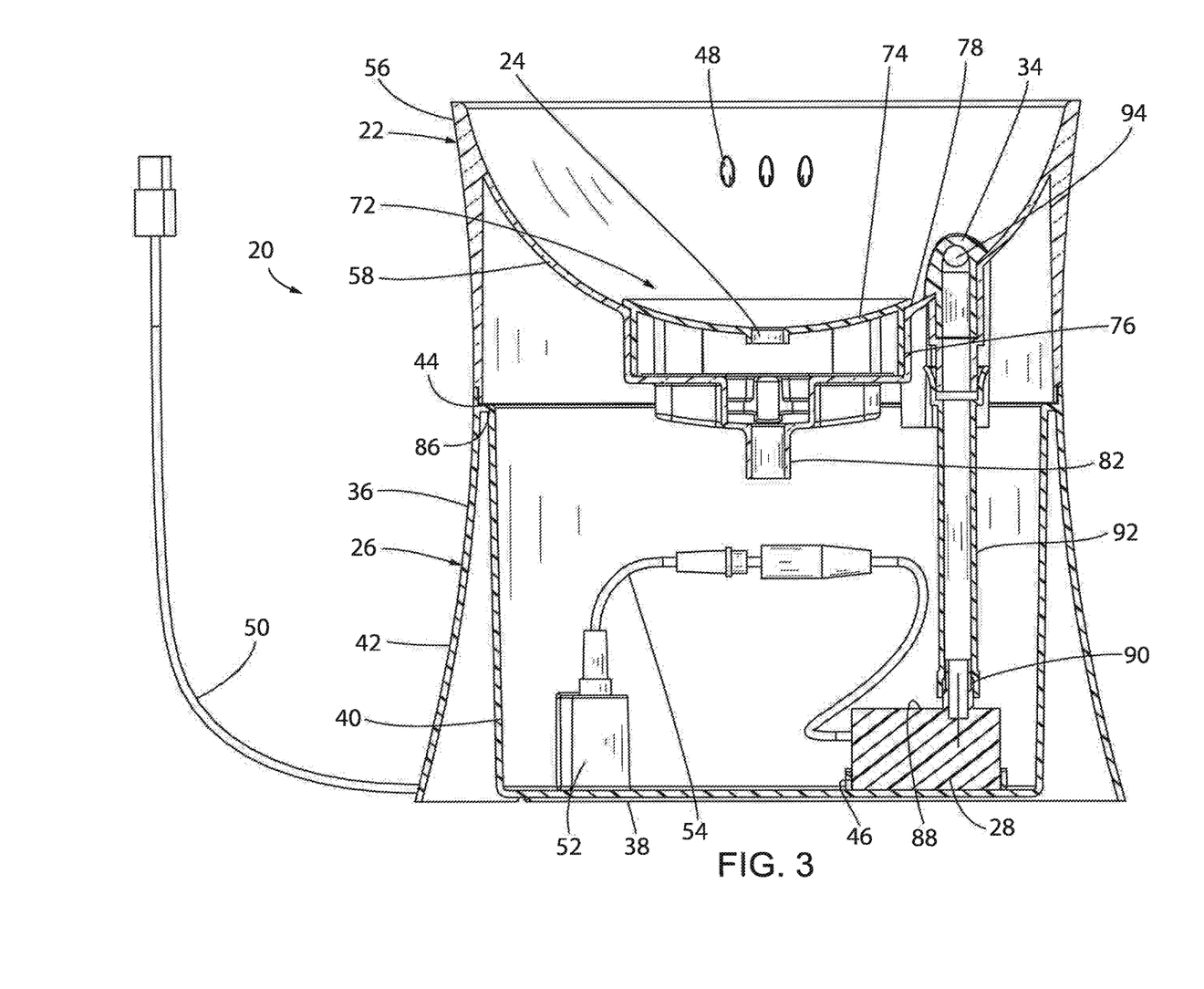
FIG. 3 is a side cross-sectional view of the waterer taken about line 3-3 of FIG. 2.
Figure 4:
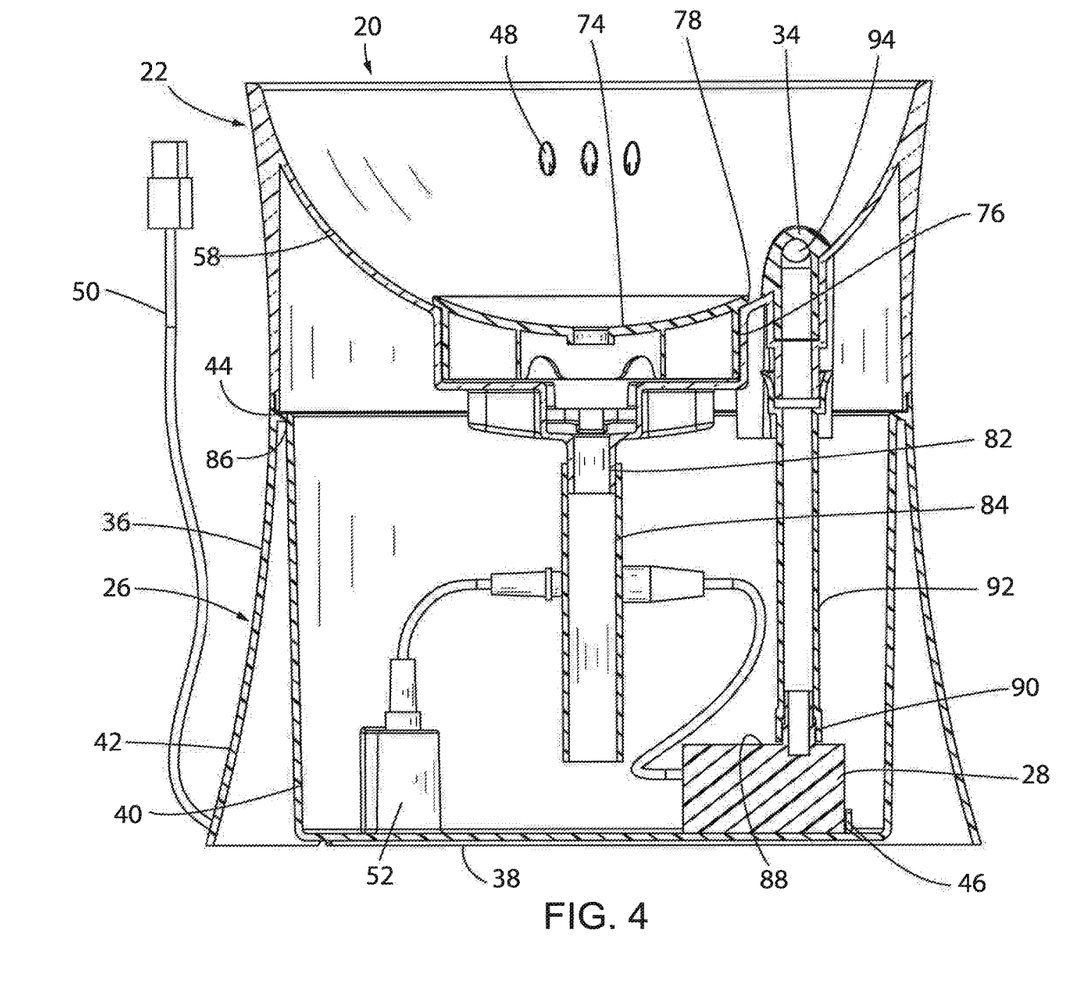
FIG. 4 is a side cross-sectional view of the waterer taken about line 3-3 of FIG. 2 with a guide tube.

Referring to FIGS. 2 and 3, the water-holding basin 26 of this embodiment is generally cylindrical in shape with a side 36 extending around a bottom surface 38. The basin 26 may be made of an injection-molded plastic, silicone, ceramics, glass, bamboo, wood, metal, or any other water impermeable material. The basin 26 is configured to hold water 32 that flows from the bowl 22 located above the basin 26 down into the basin 26, after which it can later be returned to the bowl 22 by the pump 28. The side 36 of the basin 26 includes an inner wall 40 and a spaced-apart outer wall 42. Additionally, the basin 26 includes a lip 44 that extends between the inner wall 40 and the outer wall 42 at the top of the basin 26, upon which the bowl 22 may be seated. As shown in FIG. 4, retaining plates 46 may extend upwardly from the bottom surface 38 to retain the pump 28 in the desired location within the basin 26. The plates 46 may act as spring clips that securely hold the pump 28 in place. Of course, the basin 26 could similarly be in many different shapes, dimensions, and the like as long as it is capable of receiving water that is drained from the bowl 22 and of returning that water 32 to the pump 28.

Also, the basin 26 may have channels formed between the inner wall 40 and the outer wall 42. For instance, a channel (not shown) may be formed between the inner wall 40 and the outer wall 42 to provide an overflow protection or prevention system, allowing water 32 to return to the basin 26 in the event that the water level exceeds a certain height in the bowl 22. A drain 48 may be formed in the perimeter wall 56 of the bowl 22, through which water 32 flows into the channel. Furthermore, a chase (not shown) may be provided to accommodate an electrical feed 50 associated with the pump 28. Electrical feed 50 connects to a power cord base 52 located within the basin 26, which has additional wiring 54 that connects to the pump 28. Of course, the electrical feed 50 could similarly be connected directly to the pump 28.

Next, the bowl 22 will be described with reference to FIGS. 1-5. Like the basin 26, the bowl 22 includes a side or perimeter wall 56 that extends around a lower floor or base surface 58. The bowl 22 may be made from glass, an injection molded plastic, silicone, ceramics, glass, bamboo, wood, metal, or any other water impermeable material. Additionally, it may be transparent, translucent, or light-blocking. The perimeter wall 56 is cylindrical in this embodiment. The base surface 58 of this embodiment thus is circular when viewed in a top plan view, as shown in FIG. 2. However, the bowl 22 conceivably could be ovoid, polygonal, or any other desired shape. Where the bowl 22 is located directly above the basin 26, typically the bowl 22 and the basin 26 will have a similar shape when viewed in a top plan view.

Figure 5:
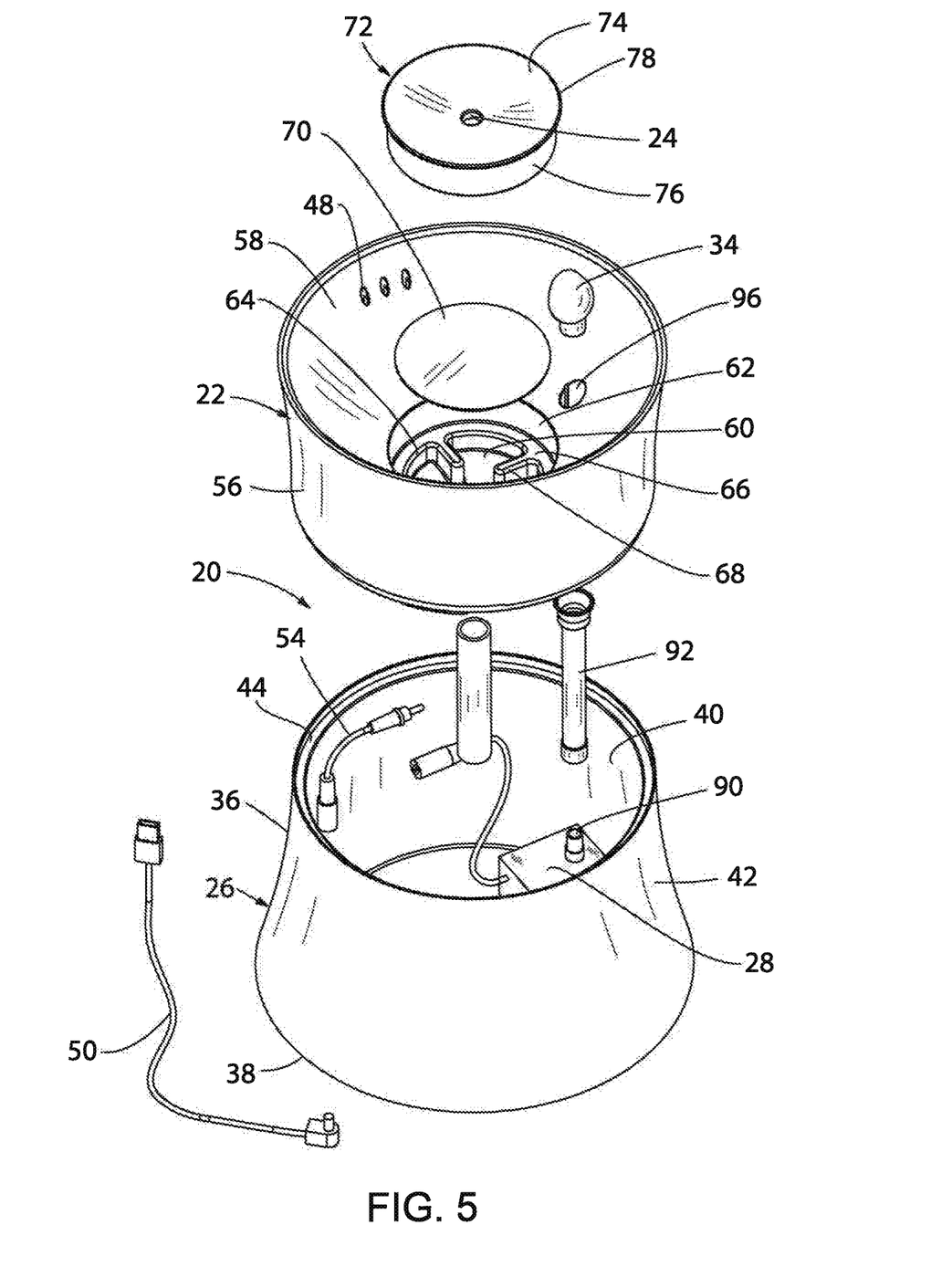
FIG. 5 is an exploded top perspective view of the waterer of FIGS. 1, 2, and 4.

Also, the bowl 22 may have an opening 60 formed in the center of the base surface 58, as best seen in FIG. 5. As shown, the opening 60 is substantially circular in shape, although it could be formed of any desired shape. A sidewall 62 may extend around the perimeter of the opening 60. Additionally, a shelf 64 may extend inwardly from the sidewall 62 towards the center of the opening 60. As shown, the shelf 64 includes an outer ridge 66 that extends around the entire perimeter of the opening 60, and at least one finger 68 extending further towards the center of the opening 60. Two fingers 68 are visible in FIG. 4, with two additional fingers being hidden by the sidewall 62 of the bowl 22. Of course, the bowl 22 could conceivably include additional fingers or fewer fingers or any other support structure(s) extending inwardly from the perimeter of the opening 60. Also, the bowl 22 could have no fingers at all, but rather it could just have the outer ridge 66.

The opening 60 may be configured to receive a variety of components. For instance, still looking to FIG. 5, a filter 70 may be inserted therein. The filter 70 is configured to be substantially the same size and shape as the opening 60. As such, it is substantially circular in shape in this embodiment. Once the filter 70 is inserted into the opening 60 and supported on the fingers 68, it can be pressed upon the shelf 64. In this way, the outer ridge 66 and fingers 68 support the filter 70 and keep it in place.

Additionally, the bowl 22 may include an upper bowl inner plug 72 as best seen in FIGS. 3 and 4, The upper bowl inner plug 72 has an upper wall 74 and a tubular sidewall 76 that extends downwardly from the upper wall 74. The upper surface of the upper wall 72 forms part of the base surface 58 of the bowl 22. A drain opening 24 extends through the upper wall 74 through the plug 72. Again, the upper bowl inner plug 72 is configured to be compatible with the opening 60, both in size and shape. As such, here the upper bowl inner plug 72 is substantially circular in shape. The tubular sidewall 76 has a diameter that is slightly less than the diameter of the opening 60 such that the upper bowl inner plug 72 can be inserted into the opening 60 and retained in position. Additionally, the diameter of the upper wall 74 may be slightly greater than the diameter of the opening 60. The upper side 74 has a downwardly facing lip 78 at its outer perimeter that rests upon the base surface 58. Once the upper bowl inner plug 72 is inserted into the opening 60, it secures the filter 70 in place.

The base surface 58 is concave so as to direct water toward the drain opening 24. The base surface 58 may be sloped and/or curved along part or all of its radius to reduce the amount of force that is required for moving water 32 to impose a force on debris 80 that rests on the base surface 58 to overcome the static friction between the debris 80 and the base surface 58. The curvature of the base surface 58, in cooperation with the Coriolis Effect, may also impart a vortex to water 32 flowing toward the drain opening 24. These effects can be achieved by providing all or part of the base surface 58 and/or upper bowl inner plug 72 with a non-linear gradient slope. For example, all or a portion of the base surface 58 may take the shape of a parametric curve when viewed in vertical cross section through the center of the drain opening 24. The curve may have the inverse function of $y=1/(Fx)$, where x is the radial distance from the center of the drain opening 24 and F is a positive multiplier that defines the steepness of the inverse function. The value of "F" may be selected on a number of factors including the overall dimensions of the bowl 22, the viscosity of the liquid draining from the bowl 22, and the degree of swirl desired. For example, shaping the base surface 58 for swirl inducement is more important where the waterer 20 is used in applications where the debris 80 settles on the base surface 58 or the upper bowl inner plug 72, and less important when the debris 80 is exclusively or primarily on the top of the water 32 or suspended in the water 32. Depending on the amount of swirl inducement desired, the portion of the base surface 58 taking on this shape could be all, the inner ¾ or less relative to the drain opening 24, the inner ½ or less relative to the drain opening 24, or the inner ¼ or less relative to the drain opening 24. If less than all of the base surface 58 and the upper side 74 of the upper bowl inner plug 72 takes on this shape, the remainder of the base surface 58 and upper bowl inner plug 72 could slope linearly or non-linearly toward the drain opening 24 to assure proper drainage of the bowl 22. It is also possible that the value of F could vary from region to region along the radius of the bowl 22 or even within a particular region. It should also be noted that different upper bowl inner plugs having different slope configurations can be inserted into the opening, where the upper surface of each plug produces base surface portion having different flow characteristics. This would allow an assembler or even a user to change the flow characteristics of the waterer 20 while using all of the same component parts, apart from the upper bowl inner plug 72.

As described, the bowl 22 is made of a multi-piece construction. However, it should be noted that the bowl could similarly be made in a one-piece construction, wherein the upper bowl inner plug 72 is formed with the base surface 58 of the bowl 22.

The bowl 22 is configured to be seated onto the basin 26. For example, as best seen in FIGS. 3 and 4, the bowl 22 may have a base 86 located at the bottom of the wall 56 that can rest upon the lip 44 of the basin 26. In this way, the bowl 22 is securely seated relative to the basin 26.

Additional components associated with the movement of the water 32 after it enters the drain opening 24 now will be described. For instance, a drain tube 82 may extend downwardly from the shelf 64, as seen in FIGS. 3 and 4. The drain tube 82 may be formed with the bowl 22 and the shelf 64, or it could be a separate component that is affixed to bowl 22 or the shelf 64. Because of the location of the drain tube 82 directly beneath the drain opening 24, it helps to guide the water 32 from the bowl 22 down into the basin 26.

The waterer may also have a guide tube 84 that extends further down from the drain tube 82, as seen in FIG. 4. As shown, the guide tube 84 is a separate component from the drain tube 82, where the guide tube 84 has a slightly larger diameter than the drain tube 82. This allows the drain tube 82 to be securely inserted into the guide tube 84. Alternatively, the guide tube 84 and drain tube 82 could be manufactured together. Similarly, the guide tube 84 and drain tube 82 could all be formed with the bowl 22 or the shelf 64. Because of the length of the guide tube 84, the diameter of the guide tube 84, and the distance between the bottom of the guide tube 84 and the bottom surface 38 of the basin 26, air is incorporated into the water 32 as it falls through the guide tube 84 and once it reaches the bottom surface 38. This results in the formation of bubbles in the water 32. As a result of this motion, the water 32 that reaches the bottom surface 38 desirably has an enhanced amount of oxygen located therein.

Incorporating oxygen into the water 32 may have a number of benefits, including altering flow characteristics of the water 32. For instance, water 32 having oxygen blended therein makes less noise when it contacts the basin 26 in comparison to water that does not have oxygen blended therein, all other things equal. This is primarily because the oxygen serves as a cushion to the water 32 once it reaches the basin 26. Additionally, the guide tube 84 and/or the drain tube 82 may extend sufficiently downwardly to induce laminar flow of the water 32 moved therethrough in order to reduce noise that might otherwise occur once the water enters the basin 26.

The pump 28 may be a submersible pump that rests on or is secured to the bottom surface 38 of the basin 26. The pump 28 has an intake 88 through which water 32 is drawn from the interior of the basin 26 into the pump 28 and out through a discharge outlet 90. Alternatively, the pump 28 may be located externally of the basin 26, in which case the pump's inlet may be connected to the basin 26 by a supply line (not shown).

The discharge outlet 90 of pump 28 is in fluid communication with the bowl 22, and more specifically with the at least one pump outlet jet 34 that is mounted within the bowl 22, such that water 32 is pumped from the basin 26 to the interior of the bowl 22. For instance, an uplift tube 92 can be used to deliver the water 32 from the discharge outlet 90 to the jet or jets 34. The number of pump outlet jets 34 will determine the specific configuration of the uplift tube 92. In the example of FIGS. 1-5, a single pump outlet jet 34 is provided with a single uplift tube 92 to transport water 32 to the bowl 22. Where multiple pump outlet jets are used, either multiple pumps may be provided, or a single pump may be provided with a branched outlet tube to send the water to different jets.

Next, the pump outlet jet 34 will be described. The pump outlet jet 34 include an outlet 94 from which water 32 is pumped into the bowl 22. The pump outlet jet 34 may be a separate piece from the bowl 22 as seen in FIG. 4 that is snapped or otherwise inserted into openings 96 formed in the base surface 58. Alternatively, the pump outlet jets 34 may be formed with the bowl 22.

A variety of different possible pump outlet jet configurations will further be described below, any of which can be incorporated into any of the embodiments described above. These different configurations result in different water flow patterns, such that the pump outlet jet or jets 34 induce a desired swirl. The swirl displaces suspended or floating debris. The swirl also helps to displace debris 80 that is stuck to the base surface 58. This displacement causes the debris to be suspended in the water 32, after which the vortex 30 helps to force the water 32 and particles out of the drain opening 24. Additionally, the pump outlet jets 34 help to improve the formation of the vortex 30 to maximize movement of water 32 about the entire bowl 22. Further still, the pump outlet jets 34 may be configured to maximize the amount of oxygen that is introduced into the water 32 as it flows about the waterer 20.

Initially, it should be noted that the pump outlet jet 34 may be configured so as to pump water 32 in either a clockwise or a counter-clockwise direction. As known to those of ordinary skill in the art, the ideal direction of the water flow is influenced by the Coriolis Effect. Therefore, the desired direction could be different in the northern hemisphere and the southern hemisphere. The direction of water flow in a clockwise or counter-clockwise direction can result in more significant water movement in one direction, or smoother water movement in the opposite direction.

Further, the number of pump outlet jets 34 may vary. As shown in FIGS. 1-5, the waterer 20 includes a single pump outlet jet 34, whereas the waterers 120, 320 shown in FIG. 6 and FIG. 7 respectively (described in greater detail below), include first and second pump outlet jets 134a, 134b, 334a, 334b. Where plural outlet jets are provided, they may be spaced circumferentially and/or radially from one another. The waterer could similarly have three or more pump outlet jets. While additional pump outlet jets 34 result in additional sources of water movement, the more pump outlet jets 34 a waterer 20 has, the lesser the amount of force with which the water 32 is pushed out of the pump outlet jets 34, assuming a single pump 28 is used. Where multiple pump outlet jets 34 are provided, the pump outlet jets 34 may be spaced equidistantly around the circumference of the bowl 22. Stated differently, where two pump outlet jets are used, the pump outlet jets may be spaced 180 degrees from one another. Similarly, where three pump outlet jets (not shown) are used, the pump outlet jets may be spaced 120 degrees from one another. The discussion that follow refers to a single pump outlet jet, it being understood that the discussion applies equally to a configuration having two or more jets.

Also, the radial spacing between the pump outlet jet 34 and the center of the drain opening 24 (or, stated another way, between the pump outlet jet 34 and the perimeter wall of the bowl 22) can similarly be selected. The closer the pump outlet jet 34 is to the center of the drain opening 24, the greater the flow in the center of the bowl 22, with reduced flow at the wall 56 of the bowl 22.

Additionally, the inclination of the outlet 94 of each pump outlet jet 34 relative to the radial and relative to the vertical can be selected, it being preferred that the jet 34 extends non-radially and non-vertically. It should be noted that, where the pump outlet jet 34 is a separate piece from the bowl 22, a user or assembler can adjust the angle of the pump outlet jet 34 based on a desired effect. Where the pump outlet jet 34 is formed with the bowl 22, the inclination of each pump outlet jet 34 typically will not be adjustable. Where it is positionally adjustable, the pump outlet jet 34 can be positioned to expel water substantially tangentially or perpendicularly to radial. In such a configuration, there is significant swirl around the wall 56 of the bowl 22, with less induced swirl in the center. The outlet 94 of the pump outlet jet 34 can also be directed away from tangent toward the center of the bowl. The more the outlet 94 of pump outlet jet 34 is inclined toward the center of the drain opening 24, the greater the vortex 58 that is created. However, this positioning also tends to result in larger dead zones where debris and other material collect around the wall 56. Thus, where a greater vortex 30 is desired, the size of dead zones tends to increase. The pump outlet jet 34 may be positioned to minimize or completely eliminate such dead zones. Also, the pump outlet jet 34 is positioned to maximize the amount of oxygen that is incorporated into the water 32 as it moves about the waterer 20. Finally, the outlets 94 of the pump outlet jet 34 could extend horizontally or could be inclined upwardly or downwardly at an acute angle of up to, for example +/−45 degrees.

The volumetric liquid flow rate into a bowl 22 of a given fountain will depend on and be essentially equal to the volumetric capacity of the pump 28. The area of the bowl's drain opening 24 may be selected so that the volumetric flow rate out of the bowl 22 through the drain opening 24 equals the volumetric flow rate into the bowl 22 as determined by the volumetric capacity of the pump 28.

As should be clear from the foregoing, the swirl inducing measures generated by liquid flowing into and out of a bowl 22 can be implemented independently of one another. For example, the base surface 58 of a bowl 22 can be sloped to induce a vortex 30 in outflowing water, while liquid may be supplied to the bowl 22 in a percolating or drip fashion or some other fashion that does not, in and of itself, induce swirl.

Figure 6:
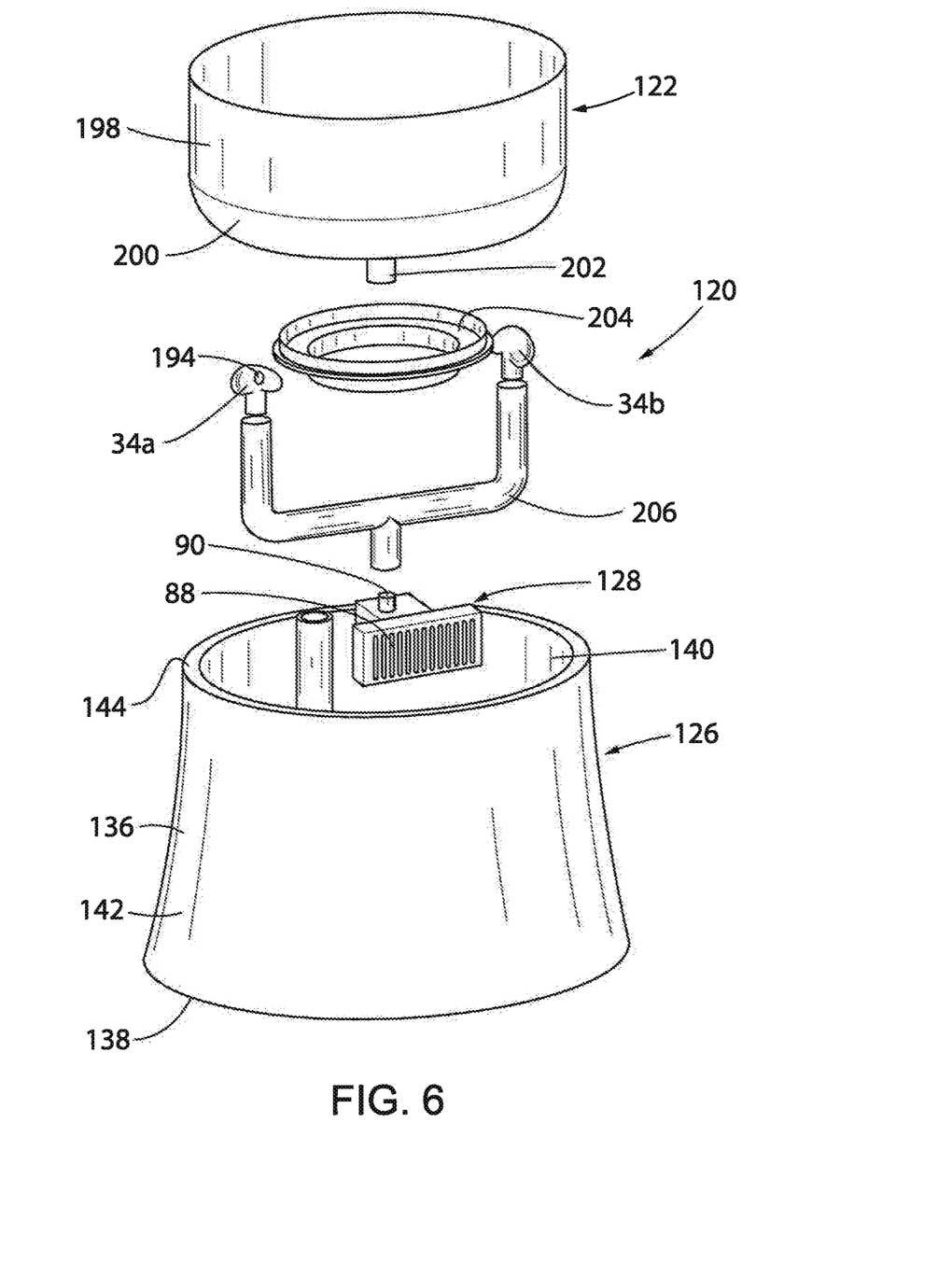
FIG. 6 is a top perspective view of another embodiment of a recirculating vortex waterer constructed in accordance with the invention.

Another embodiment of the waterer 120 is shown in FIG. 6. Many of the same features described above are similar, if not identical to those described above for this waterer 120. These components are designated by the same reference characters as the components of the waterer 20 of FIGS. 1-5, incremented by 100. This waterer 120 features a bowl 122 with a single wall 198 that constitutes both the outer bowl wall and the base surface. In this embodiment, the single wall 198 has a curved bottom potion 200 that rests upon the basin 126. Additionally, the single wall 198 may extend downwardly and terminate in a cylinder 202 that deposits water 132 into the basin 126.

The waterer 120 may also include a pre-filter 204 that is located directly beneath the cylinder 202. Thus, any water 132 that enters the basin 126 must first pass through the pre-filter 204. In this way, the pre-filter 204 filters any water 132 entering into the basin 126 before it reaches the basin 126 and the pump 128. The pre-filter 204 will be particularly desirable when the waterer 120 is used outdoors to collect leaves, rocks, and hair, and in other applications where large pieces of debris are expected. The pre-filter 204 may include a screen or mesh that can easily be removed and cleaned before being returned to the basin 126. Use of the pre-filter 204 will help reduce stress on the pump 128, and in turn will extend the life of the pump 128.

Additionally, the waterer 120 includes multiple pump outlet jets. More specifically, the waterer 120 includes a first pump outlet jet 134a and a second pump outlet jet 134b. As shown, these jets are spaced circumferentially from one another at diametrically opposite sides of the bowl 122. As such, they are located substantially 180 degrees from one another. The illustrated outlet jets 134a and 134b could be located a common distance from the center of the opening 24 as shown, or could be spaced radially from one another with one being closer to the opening 24 than the other. It is also possible that two or more outlet jets could be spaced from one another along a common radial line.

Despite the fact that the waterer of this particular embodiment has two pump outlet jets 134a, 134b, it still utilizes only a single pump. In order to do so, a T-shaped prong 206 may be used. Alternative prongs could similarly be used, such as a Y-shaped prong, or any other prong, or an additional pump could be provided.

Figure 7:
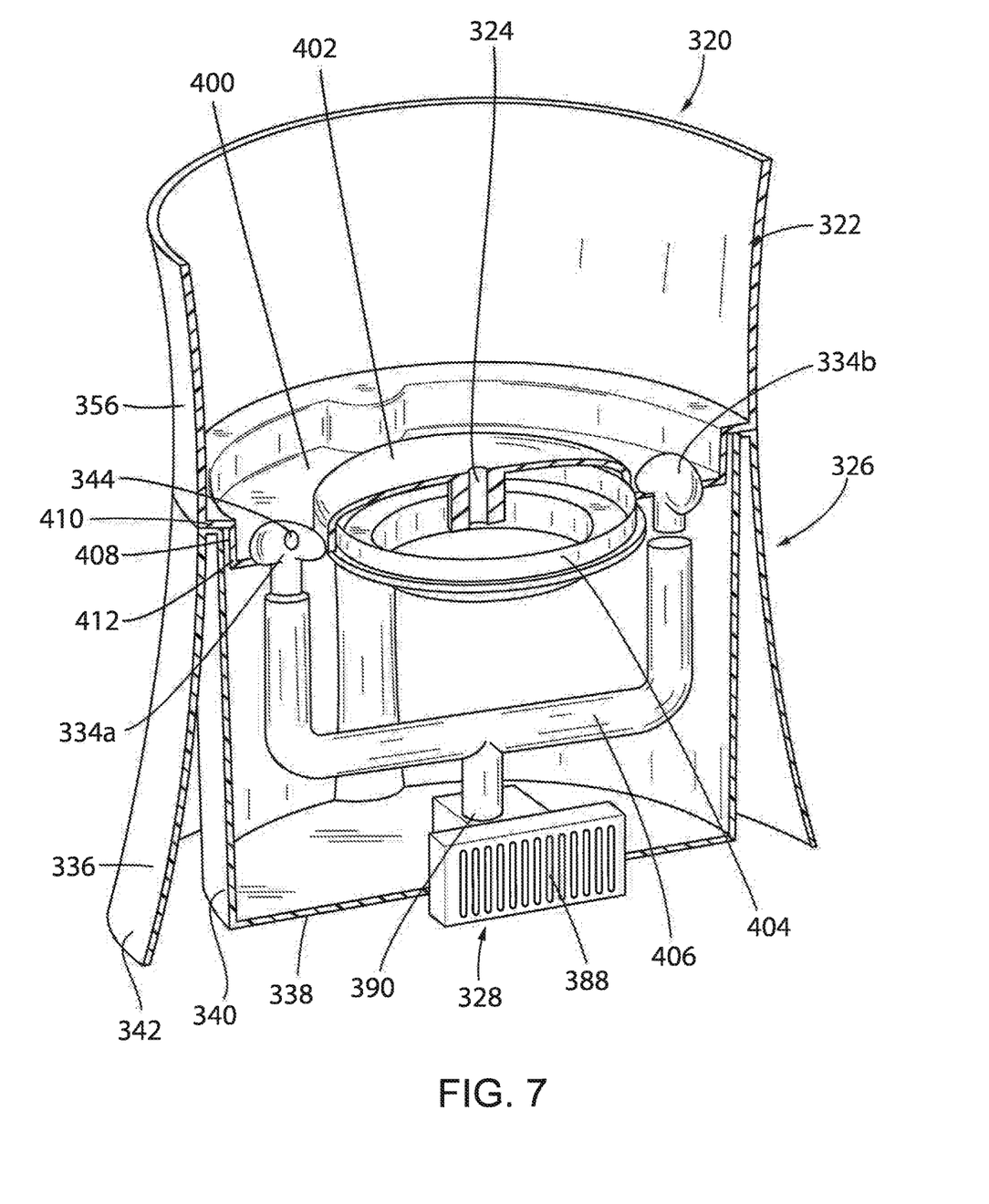
FIG. 7 is a cutaway perspective view of another embodiment of a recirculating vortex waterer constructed in accordance with the invention.

Yet another similar embodiment of the waterer 320 is shown in FIG. 7. Many of the same features described above are similar, if not identical to those described above for this waterer. These components are designated by the same reference characters as the components of the waterer 20 of FIGS. 1-5, incremented by 300. Unlike the other embodiments, FIG. 7 shows a bowl 322 with a base surface 358 that lacks the described parametric slope. Instead, the base surface 358 includes an outer annular portion 400 surrounding a raised center portion 402. The raised center portion 402 contains a cylinder with a drain opening 324. The center portion 402 may also receive the pre-filter 404 in a nested relationship beneath the center portion 402.

Additionally, the waterer 320 again includes two jet outlets 234a, 234b located diametrically opposite from one another. In this case, the jet outlets 234a and 234b are located on the recessed annular portion 400 and force liquid up and out of the well formed by the recessed annular portion 400. Again, a single pump 328 is provided, with a T-shaped prong 406 that delivers water to both of the jet outlets 234a, 234b.

Additionally of note, due to the substantially flat base surface 358, a notch 408 is provided that may be formed along the bottom of the wall 356 to create a top edge 410 and a side edge 412. When installed, the top edge 262 abuts the lip 344, and the side edge 412 abuts the inner wall 340.

While specific materials have not been discussed, it should be noted that the various components could be made of any suitable, durable materials, including but not limited to, plastic, stainless steel, other metals, glass, and the like.

Other embodiments and uses of the invention will be apparent to those skilled in the art from consideration from the specification and practice of the invention disclosed herein. It is understood that the invention is not confined to the specific materials, methods, formulations, operating/assay conditions, etc., herein illustrated and described, but embraces such modified forms thereof as come within the scope of the following claims.

What is claimed is:

1. A recirculating fountain comprising:
   a liquid-holding basin;
   a bowl located above the basin and having a base surface, an opening formed in the base surface, and a perimeter wall extending upwardly from the base surface to define an interior;
   an enclosed drain bowl plug chamber comprising:
   a sidewall extending downwardly from the base surface around the opening of the bowl; and
   a shelf extending inwardly from the sidewall, wherein the shelf is vertically offset from the opening;
   a pump having an intake in fluid communication with the basin and a discharge outlet in fluid communication with the interior of the bowl;
   a drain bowl plug removably insertable into the drain bowl plug chamber and having an upper surface forming at least a portion of the base surface of the bowl, wherein a drain opening extends through the drain bowl plug; and
   a filter located between the shelf and the drain bowl plug, wherein the filter rests upon the shelf,
   wherein the drain bowl plug holds the filter against the shelf, and
   wherein the fountain is structurally and operationally configured such that a liquid is swirled about the bowl by the flow of liquid into and out of the bowl to inhibit accumulation of debris in the bowl.

2. The recirculating fountain of claim 1, wherein a side of the drain bowl plug abuts the sidewall when the drain bowl plug is inserted into the opening.

3. The recirculating fountain of claim 1, further comprising:
   a drain tube extending downwardly from the shelf; and
   a guide tube releasably attached to the drain tube;
   wherein the fountain is structurally and operationally configured such that
   the liquid flows from the bowl into the drain opening;
   the liquid flows from the drain opening and to the filter;
   the liquid flows through the filter into the drain tube;
   the liquid flows through the drain tube into the guide tube; and
   the liquid flows through the guide tube into the basin.

4. The recirculating fountain of claim 3, wherein the fountain is structurally and operationally configured such that oxygen is incorporated with the liquid while it falls through the guide tube into the basin.

5. The recirculating fountain of claim 1, further comprising at least one pump outlet jet that is located in the bowl and that is in fluid communication with the discharge outlet of the pump;
   wherein the at least one pump outlet jet has an outlet opening into the interior of the bowl.

6. The recirculating fountain of claim 5, wherein the outlet of the at least one pump outlet jet extends non-radially and non-vertically.

7. The recirculating fountain of claim 5, wherein the outlet of the at least one pump outlet jet extends substantially perpendicular to a radial of the bowl.

8. The recirculating fountain of claim 1, wherein a slope of the base surface is configured to create a vortex to induce movement of a quantity of liquid about the fountain toward the drain opening.

9. The recirculating fountain of claim 8, wherein at least a portion of the base surface is sloped at a parametric curve toward the drain opening so as to induce a vortex in the liquid flowing toward the drain opening.

10. A method of using a recirculating fountain comprising the steps of:
    supplying a liquid to an interior of a bowl that is removably mounted to a basin, wherein the bowl has a base surface with an opening formed therein, a sidewall extending downwardly from the base surface around the opening of the bowl, a shelf supported on the sidewall, and a perimeter wall extending upwardly from the base surface to define an interior;
    moving the liquid about the bowl and down into a drain opening formed in a drain bowl plug that is removably inserted in the opening in the bowl;
    inducing a swirl to the liquid during at least one of the supplying and moving steps;
    causing liquid to flow out of a bottom outlet of the drain opening, through a filter located beneath the bottom outlet of the drain opening and resting on the shelf,
    thence into a guide tube extending beneath the filter, and thence into the basin; and
    incorporating oxygen with the liquid while the liquid drops down the guide tube and into the basin, wherein the filter is held against the shelf by the drain hole plug.

11. The method of claim 10, further comprising the step of:
    pumping the liquid through a pump mounted to the basin and through a discharge outlet in fluid communication with the bowl so as to induce a swirl about the basin.

12. The method of claim 11, wherein the pumping step includes
    pumping the liquid through a pump outlet into an uplift pipe; and
    pumping the liquid from the uplift pipe and out of at least one pump outlet jet substantially perpendicular to a radial of the bowl.

13. The method of claim 10, further comprising the steps of:
    removing the drain bowl plug from the opening formed in the base surface of the bowl;
    removing the filter from the shelf; and
    replacing the filter.

14. A recirculating fountain comprising:
    a liquid-holding basin;
    a bowl removably mounted to the basin and having a base surface with an opening formed therein, a sidewall extending around the opening, a perimeter wall extending upwardly from the base surface to define an interior, and a shelf formed in the sidewall;
    a filter inserted into the opening in the base surface and resting upon the shelf;
    an upper bowl inner plug mounted within the opening, the upper bowl inner plug having a drain opening formed therein having a lower outlet located above the filter, an upper surface of the bowl inner plug forming at least a portion of the base surface; and a pump having an intake in fluid communication with the basin and a discharge outlet jet in fluid communication with the interior of the bowl, the discharge outlet jet extending non-radially and non-vertically;

wherein the fountain is structurally and operationally configured such that oxygen is incorporated with a liquid as it moves from the bowl, through the drain opening and the filter, and into the basin; and wherein the upper bowl inner plug holds the filter against the shelf.

15. The fountain of claim 14, further comprising a guide tube extending downwardly from the bowl beneath the drain opening;

wherein oxygen is incorporated into the liquid while the liquid falls down the guide tube.

16. The fountain of claim 14, further comprising a guide tube extending downwardly from the bowl beneath the drain opening;

wherein the fountain is structurally and operationally configured such that oxygen is incorporated into the liquid once the liquid reaches a bottom surface of the basin.

17. The fountain of claim 14, further comprising:

a plurality of discharge outlets; and a plurality of pump outlet jets spaced circumferentially and/or radially of one another;

wherein each of the plurality of discharge outlets extends substantially perpendicular to a radial of the bowl.

18. The fountain of claim 14, further comprising:

an uplift tube extending from the discharge outlet of the pump to the discharge outlet.

* * * * *